United States Patent [19]

McGrew et al.

[11] Patent Number: 5,266,336

[45] Date of Patent: Nov. 30, 1993

[54] HIGH FLAVOR IMPACT NON-TACK CHEWING GUM WITH REDUCED PLASTICIZATION

[75] Inventors: Gordon N. McGrew, Evanston; Albert H. Chapdelaine, Naperville, both of Ill.

[73] Assignee: Wm. Wrigley Jr. Company, Chicago, Ill.

[21] Appl. No.: 40,563

[22] Filed: Mar. 31, 1993

Related U.S. Application Data

[63] Continuation of Ser. No. 791,039, Nov. 12, 1991, abandoned.

[51] Int. Cl.$^5$ .............................................. A23G 3/30
[52] U.S. Cl. ............................................. 426/4; 426/650
[58] Field of Search ......................................... 426/3-6, 426/650

[56] References Cited

U.S. PATENT DOCUMENTS

| | | | |
|---|---|---|---|
| 2,069,477 | 2/1937 | Manson | 426/3 |
| 2,076,112 | 4/1937 | Barker | 426/4 |
| 2,137,746 | 11/1938 | Wilson | 426/3 |
| 2,154,482 | 4/1939 | Weber | 426/3 |
| 2,383,145 | 8/1945 | Moose | 426/3 |
| 3,984,574 | 10/1976 | Comollo | 426/4 |
| 4,187,320 | 2/1980 | Koch et al. | 426/3 |
| 4,241,090 | 12/1980 | Stroz et al. | 426/4 |
| 4,352,822 | 10/1982 | Cherukuri et al. | 426/4 |
| 4,409,244 | 10/1983 | Cherukuri et al. | 426/4 |
| 4,415,593 | 11/1983 | Glass et al. | 426/4 |
| 4,452,820 | 6/1984 | D'Amelia et al. | 426/3 |

FOREIGN PATENT DOCUMENTS 0421670  4/1991  European Pat. Off. .

*Primary Examiner*—Jeanette Hunter
*Attorney, Agent, or Firm*—Willian Brinks Olds Hofer Gilson & Lione

[57] ABSTRACT

An abhesive, high flavor impact chewing gum is provided which has reduced plasticization. The chewing gum includes a non-tack chewing gum base, one or more sweeteners, and a spray dried flavor ingredient containing spearmint flavor, wintergreen flavor, citrus oil or food acceptable aliphatic esters. A method for preparing the abhesive, high flavor impact chewing gum is also provided.

27 Claims, No Drawings

HIGH FLAVOR IMPACT NON-TACK CHEWING GUM WITH REDUCED PLASTICIZATION

This application is a continuation of application Ser. No. 07/791,039, filed Nov. 12, 1991, now abandoned.

BACKGROUND OF THE INVENTION

The present invention relates to a non-tack chewing gum composition which has high flavor impact and reduced plasticization. The present invention also includes a method of preparing a non-tack chewing gum with high flavor impact and reduced plasticization.

BACKGROUND OF THE INVENTION

U.S. Pat. No. 3,984,574, issued to Comollo, discloses an inherently non-tacky chewing gum which does not adhere to dentures, fillings or natural teeth. This non-tacky or abhesive chewing gum includes a base containing elastomers such as polyisobutylene, polyisoprene, isobutylene-isoprene copolymer or butadiene-styrene copolymer, present in from 5–35 percent; hydrogenated or partially hydrogenated vegetable oils or animal fats, present in from 5–50 percent; mineral adjuvants, present in from 5–40 percent; polyvinyl acetate which may be present in up to 55 percent; fatty acids which may be present in up to 20 percent; and mono and diglycerides of fatty acids which may be present in up to 10 percent, by weight of the base composition.

The foregoing combination of ingredients was found not to adhere to natural teeth, artificial teeth or dentures to any significant degree, without requiring the use of a detackifier. Certain tack-producing components and combinations used in the conventional chewing gums were eliminated from the Comollo composition. Such conventional ingredients included in known chewing gums, but excluded by Comollo, included natural gums such as Chicle or Jelutong, glycerol ester gums, and waxes.

Many conventional chewing gums depend on the use of a detackifier to reduce tackiness. U.S. Pat. No. 4,582,707, issued to Calabro, discloses to the use of carboxymethyl cellulose to alleviate the stickiness caused by hydrogenated starch hydrolysates in chewing gum. U.S. Pat. No. 4,479,969, issued to Bakal et al., discloses the use of lactose-hydrolyzed whey or whey fractions in place of soluble sweetener, emulsifier and plasticizer components to produce softer chewing gums which are not sticky.

U.S. Pat. No. 4,387,108, issued to Koch et al., discloses a non-adhesive chewing gum base containing an elastomer, at least one emulsifier including lecithin or lecithin derivatives, an elastomer solvent including the glycerol ester of partially hydrogenated wood rosin, a non-toxic vinyl polymer and at least one oleaginous plasticizer. U.S. Pat. No. 4,357,355, issued to Koch et al., discloses a non-adhesive bubble gum base containing a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids and others.

U.S. Pat. No. 4,518,615, issued to Cherukuri et al., discloses a non-adhesive gum base composition including an elastomer, elastomer solvent, polyvinyl acetate, emulsifier, low molecular weight polyethylene, waxes, plasticizer and fillers. U.S. Pat. No. 4,352,822, issued to Cherukuri et al., discloses a synthetic non-styrene butadiene rubber gum base which has non-stick properties, which contains polyisobutylene and a mixture of polyvinyl acetate, triacetin and glyceryl monostearate as film forming-plasticizing agents together with polyterpene, polyethylene, wax, glyceryl monostearate, fatty acid esters and filler.

U.S. Pat. No. 4,352,823, issued to Cherukuri et al., discloses a coextruded chewing gum having a soft core portion which contains polyisobutylene, a combination of plasticizers, a hydrophilic detackifier, polyterpene and other ingredients to impart non-stick properties, optionally polyethylene wax, and spray dried and other flavor ingredients. U.S. Pat. No. 4,271,199, issued to Cherukuri et al., discloses a non-sticky chewing gum formed of gum base, a premixed recrystallized combination of liquid and solid sweeteners which preferably include high fructose syrup alone or together with liquid glucose, corn syrup, sorbitol syrup and/or invert sugar in combination with sucrose or sorbitol and water, and flavors, softeners, and other conventional chewing gum ingredients.

U.S. Pat. No. 4,241,091, issued to Stroz et al., discloses a non-adhesive chewing gum containing gum base, substantially calorie-free sweetener, flavor, water, thickener, filler, softener and a slip agent, the slip agent being alpha-cellulose, texturized vegetable protein, fish protein concentrate, citrus peel, citrus pulp, fruit pulp or mixtures thereof. U.S. Pat. No. 3,974,293, issued to Witzel, discloses a non-adhesive chewing gum composition including a synthetic gum base which contains titanium dioxide, various detackifying agents, viscosity modifying agents, wetting agents, and a soluble phase which includes one or more sweeteners, wetting agents, flavoring materials, coloring, and optionally chlorophyllin or other breath freshener.

U.S. Pat. No. 3,285,750, issued to Ishida, discloses a chewing gum base containing polyolefin powder or fluorine containing resin powder as an adhesion resistant agent. U.S. Pat. No. 3,255,018, issued to Comollo, discloses an abhesive chewing gum composition containing tannic acid and/or other soluble hydrolyzable tannins. EPO Patent Application 0,067,655 discloses a non-adhesive chewing gum base containing elastomer, oleaginous plasticizer, mineral adjuvants, non-toxic vinyl polymer, emulsifier, and elastomer solvent.

United Kingdom Patent Application GB 2,097,643 discloses a non-stick chewing gum containing a preformed combination of at least two sweeteners which have been recrystallized as a mixture. UK Patent Application GB 2,090,114A discloses a non-styrene butadiene rubber gum base having non-stick properties which includes polyisobutylene, a plasticizer, a hydrophilic-type detackifier, an emulsifier and an anti-tack combination including polyterpene resin, wax, and optionally polyethylene wax. Japan Patent Sho 55-19014 discloses a non-sticking chewing gum containing terpene resin and wax in addition to common chewing gum base ingredients.

Consumers desire chewing gums with high flavor impact. This property is commonly imparted to the chewing gum through the use of increased flavor levels. However, when used in non-tack or reduced-tack products, high flavor levels may cause over-plasticization of the chewing gum base, resulting in loss of non-tack properties. This is not a problem with flavors such as peppermint or cinnamon which have low plasticization properties. However, flavors such as spearmint, wintergreen and certain fruit flavors have higher plasticization tendencies and are currently limited in terms of quantities that can be used in non-tack gum.

SUMMARY OF THE INVENTION

Most flavors act as plasticizers for gum base and certain flavors, most notably spearmint oil, wintergreen (methyl salicylate), citrus oils and food acceptable aliphatic esters such as amyl acetate which are used in some fruit flavors, are especially strong plasticizers. While this is not a serious problem for most gum products, reduced-tack and non-tack chewing gums can lose their non-tack properties when excessively plasticized. Non-tack gums are commonly marketed to consumers with dentures or other dental appliances which prevent the wearer from chewing conventional gums due to excessive adhesion.

It has been discovered by the inventors that the tendency of such flavoring agents to plasticize the non-tack chewing gum is greatly reduced when the flavoring agent is passed through a spray drying process before being added to the non-tack chewing gum. Accordingly, a flavoring agent including spearmint oil, wintergreen, citrus oil and/or a food acceptable aliphatic ester, which is first spray dried, can be added to a non-tack chewing gum in greater quantities than a corresponding flavoring agent which has not been spray dried, before the gum base becomes over-plasticized and loses its non-tack properties. In accordance with the invention, it is now possible to provide a non-tack chewing gum which is flavored with spearmint oil, wintergreen, citrus oil and/or a food acceptable aliphatic ester, and which also has high flavor impact.

With the foregoing in mind, it is a feature and advantage of the invention to provide an abhesive (non-tacky) spearmint flavored chewing gum which has high flavor impact and which retains its non-tack properties during chewing.

It is also a feature and advantage of the invention to provide an abhesive wintergreen flavored chewing gum which has high flavor impact and which retains its non-tack properties during chewing.

It is also a feature and advantage of the invention to provide an abhesive fruit flavored chewing gum which has high flavor impact and which retains its non-tack properties during chewing.

It is also a feature and advantage of the invention to provide a method of preparing an abhesive high flavor impact chewing gum which is flavored with spearmint, wintergreen, citrus and/or food acceptable aliphatic ester flavors and which retains its abhesive characteristics before and during chewing.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

In accordance with the present invention, a quantity of a flavor ingredient which typically acts as a strong plasticizer is first spray dried, causing a reduction in its plasticization tendencies. The flavor ingredient may be a spearmint oil, oil of wintergreen, citrus oil and/or food acceptable aliphatic ester, or any sensorially pleasing combination thereof. The term "citrus oil" is intended to include, for instance, orange oil, lemon oil, lime oil, tangerine oil, grapefruit oil, and combinations thereof. The term "food acceptable aliphatic ester" is intended to include, for instance, amyl acetate (banana flavor), isoamyl acetate, isobutyl acetate, ethyl acetate, ethyl butyrate, ethyl propionate, and combinations thereof. The preferred food acceptable aliphatic esters are those having a lower molecular weight, such as lower alkyl esters of lower aliphatic ($C_1$ through $C_8$) alcohols and acids having molecular weights less than about 250.

The strongly plasticizing flavor ingredient may be combined with other, less strongly plasticizing flavor ingredients or may be used alone. Such combination of flavor ingredients may be accomplished either before or after spray drying. If the flavor ingredients are combined before spray drying, then the combination is spray dried.

The flavor ingredient is spray dried with a food acceptable dry carrier such as maltodextrin, gum arabic, cellulose derivatives, etc. Typically, the spray dried ingredient will contain about 5 to about 50 weight percent flavor, with the remainder being the dry carrier. The preferred spray drying equipment is a standard spray dryer with a nozzle atomizer. After spray drying, the flavor ingredient is in the form of a powder.

The spray dried flavor ingredient is now ready to be added to a non-tack chewing gum composition. In accordance with the invention, the spray dried flavor ingredient is added in a quantity sufficient to cause the chewing gum to have an excellent flavor impact when chewed by the consumer. The actual amount of spray dried flavor required to accomplish this objective depends on several factors. These include the level of flavor impact desired, the level of optional liquid flavor used, the active level of flavor in the spray dried component, the potency of the flavor and the base level in the gum.

The level of spray dried flavor employed will be greatly influenced by the foregoing considerations. Of special importance is the active level of flavor in the spray dried flavor ingredient which may range from less than 5 to more than 50 percent by weight of the spray dried flavor ingredient. The active flavor level in the chewing gum which is added in spray dried form will typically range from about 0.10 to about 1.50 percent by weight of the chewing gum, more preferably about 0.30 to about 1.00 percent by weight of the chewing gum and most preferably about 0.40 to about 0.80 percent by weight of the chewing gum. The actual usage levels of spray dried flavor ingredient will, of course, be higher to account for the inactive carrier in the spray dried flavor ingredient.

A liquid flavor component may optionally be employed along with the spray dried flavor in the present invention. This liquid component may be identical with the flavor used in the spray dried component. Or it may be a complementary flavor, preferably low in or devoid of strongly plasticizing flavor components which are instead incorporated into the spray dried flavor. If a liquid flavor component is used, it may be used at any desired level as long as it does not over plasticize the base. After the liquid flavor level has been optimized, the spray-dried flavor level can be adjusted to provide the desired flavor impact.

Typically, the liquid flavor (if used) will be present at a level of 0.05 to 1.5% by weight of the chewing gum.

Preferably, a level below 1.0% will be used. Most preferably the level will be below 0.80%. It is critical that the level of liquid flavor which is employed be below the level which results in over plasticization as evidenced by significant tack increases in the finished gum.

The present invention contemplates the use of any abhesive or non-tack chewing gum base and chewing gum composition. An abhesive gum base and chewing gum which are particularly suitable for use with the invention are described in Comollo U.S. Pat. No. 3,984,574, the entire disclosure of which is incorporated herein by reference. The chewing gum base of Comollo includes about 5–45 weight percent of an elastomer such as polyisobutylene, polyisoprene, isobutylene-isoprene copolymer or butadiene-styrene copolymer; about 5–50 weight percent of hydrogenated or partially hydrogenated vegetable oils or animal fats; about 5–40 weight percent mineral adjuvants; about 0–55 weight percent polyvinyl acetate; about 0–20 weight percent fatty acids; and about 0–10 weight percent mono and diglycerides of fatty acids.

The preferred elastomer for use in a Comollo-type base is a mixture of polyisobutylene and butyl rubber in a ratio of about three parts by weight polyisobutylene per two parts by weight butyl rubber. Preferably, the elastomer mixture constitutes about 15 to about 40 weight percent of the gum base, most preferably about 20 to about 30 weight percent of the gum base.

A wide range of hydrogenated or partially hydrogenated vegetable oils may be utilized in a Comollo-type non-tack gum base; for example, soybean, cottonseed, corn, peanut, and palm oil, alone or in combination. Preferably, the hydrogenated and partially hydrogenated vegetable oils and/or animal fats constitute about 20 to about 50 weight percent of the abhesive chewing gum base, most preferably about 30 to about 40 weight percent of the gum base.

A wide variety of mineral adjuvants may be used in formulating a Comollo-type non-tack chewing gum base. Preferred mineral adjuvants are calcium carbonate, talc, and tricalcium phosphate, alone or in combination. Preferably, the mineral adjuvants constitute about 5 to about 35 weight percent of the abhesive gum base, most preferably about 10 to about 20 weight percent of the gum base.

The Comollo-type gum base can also include polyvinyl acetate. When used, polyvinylacetate preferably constitutes about 10 to about 35 weight percent of the gum base, most preferably about 15 to about 25 weight percent of the base.

As noted in the background section above, the Comollo-type gum base is substantially free of natural gums, glycerol ester gums and waxes. By keeping these adhesion-producing ingredients out of the abhesive gum base, the need for one or more detackifiers in the chewing gum is alleviated. However, the spray-dried flavors of the invention may also be used in conjunction with other non-tack chewing gums, including those which contain adhesion-producing ingredients whose tack is reduced using any of the various detackifiers noted in the foregoing background section.

Another non-tack gum base which is suitable for use with the invention contains about 10–40 weight percent of a non-styrene butadiene rubber elastomer, about 10–40 weight percent fats and oils, 0 to about 15 weight percent waxes, about 15–40 weight percent polyvinyl acetate, about 2–10 weight percent emulsifier, about 6–25 weight percent terpene resin and about 5–35 weight percent filler. The elastomers may include polyisobutylene, butyl rubber, and combinations thereof. Preferably, the elastomer will constitute about 15–25 weight percent of the gum base, most preferably about 22 weight percent of the gum base.

The fats and oils useful in the gum base include one or more of fully or partially hydrogenated vegetable oils, such as soybean oil, cottonseed oil, corn oil, peanut oil and palm oil, as well as hydrogenated or partially hydrogenated animal fats such as tallow or lard. Preferably, the fats and oils constitute about 20–30 weight of the gum base, most preferably about 23 weight percent of the gum base.

Waxes include natural waxes, petroleum waxes including polyethylene waxes, paraffin waxes and microcrystalline waxes with melting points higher than 80° C., alone or in combination. Preferably, the waxes constitute about 3–10 weight percent of the gum base, most preferably about 5 weight percent of the gum base.

The fillers useful in the gum base include calcium carbonate, talc, and mixtures thereof. Preferably, the fillers constitute about 10–25 weight percent of the gum base, most preferably about 11 weight percent of the gum base.

For purposes of the present invention, the polyvinyl acetate preferably constitutes about 15–30 weight percent of the gum base, most preferably about 24 weight percent of the gum base.

Terpene resins include polymers of alpha-pinene, beta-pinene, limonene and mixtures thereof. The terpene resins preferably constitute about 8–18 weight percent of the gum base, most preferably about 10 weight percent of the gum base.

The preferred emulsifier is glycerol monostearate, in amounts from about 3–8 percent by weight of the gum base. Most preferably, the emulsifier constitutes about 5 percent by weight of the gum base.

In addition to flavoring agents, a chewing gum composition generally includes a water soluble bulk portion and a water insoluble chewing gum base portion. The water soluble portion dissipates over a period of time during chewing. The gum base portion is retained in the mouth throughout the chewing process.

Non-tack gum bases also include standard bases other than those discussed above. Such standard gum bases often utilize detackifiers to reduce the tack caused by adhesion producing ingredients. Detackifiers include, but are not limited to, carboxymethyl cellulose, alpha-cellulose, whey or whey fractions, lecithin or lecithin derivatives, polyterpenes, vegetable or fish proteins, citrus peel, citrus pulp, fruit pulp, polyolefin powder, fluorine containing resin powder, and combinations thereof. To impart non-tack properties to a standard gum base requires the addition of anywhere from about 0.1 to about 10 percent detackifier by weight of the gum base. The preferred amounts of detackifier vary widely depending on the composition of the gum base and the type of detackifier.

Standard gum bases generally contain elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

Standard gum bases typically also include a filler component such as calcium carbonate, magnesium carbonate, talc, dicalcium phosphate and the like; softeners, including glycerol monostearate and glycerol triacetate; and optional ingredients such as anti-oxidants, colors and emulsifiers.

The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

In accordance with the invention, the spray dried flavor ingredient should generally be present in the chewing gum in an amount effective to produce a desired high flavor impact upon chewing. As previously indicated, spray dried flavoring agents may include spearmint oil, oil of wintergreen, citrus oils, food acceptable aliphatic esters, and combinations thereof. Other natural and artificial flavoring agents and components may also be used in addition to the spray dried flavor ingredient in the invention.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the abhesive gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. In accordance with the invention, the spray dried flavor ingredient, and optional additional flavoring agents, are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

A non-tack wintergreen flavored gum was prepared according to the following formula:

| Component | Weight Percent |
| --- | --- |
| Base (Comollo type from U.S. Pat. No. 3,984,974) | 22.0 |
| Corn Syrup | 12.0 |
| Dextrose Monohydrate | 8.0 |
| Glycerin | 1.0 |
| Sugar | 54.7755 |
| Sorbitol | 0.9 |
| Wintergreen flavor (Methyl Salicylate) | 1.275 |
| Takasago cooling agent | 0.0495 |
| TOTAL | 100.0 |

After mixing, the chewing gum was rolled and cut into uniform sticks. Next, the chewing gum was sensory tested. The chewing gum was found to have a desirably high flavor impact but was also found to be excessively tacky for a non-tack product.

EXAMPLE 2

A quantity of wintergreen flavor was spray dried with a malto-dextrin carrier in a ratio of one part by weight wintergreen flavor per four parts by weight carrier. Standard spray drying techniques and equipment were used.

The spry dried wintergreen flavor was used in chewing gum made according to the following formula.

| Component | Weight Percent |
| --- | --- |
| Base (Comollo type from U.S. Pat. No. 3,984,974) | 22.0 |
| Corn Syrup | 12.0 |
| Dextrose Monohydrate | 8.0 |
| Glycerin | 1.0 |
| Sugar | 52.2230 |
| Sorbitol | 0.9 |
| Wintergreen flavor | 0.6375 |
| Spray dried wintergreen flavor | 3.19 |
| Takasago cooling agent | 0.0495 |
| TOTAL | 100.0 |

The chewing gum product of Example 2 was rolled and cut into sticks as in Example 1. The chewing gums of Examples 1 and 2 were subjected to in-house sensory testing. Twenty-two trained panelists chewed each gum (blind, in random order) for three minutes. Each selected the gum which had the highest flavor peak and the one which had the fastest initial flavor release. Ten out of the 22 panelists selected the gum of Example 2 to have the fastest initial flavor release and 13 out of 22 selected the same gum as having the highest peak. Neither result was statistically significant and both gums were considered to be at parity for the two properties, each having satisfactory flavor release and flavor impact.

Thirty-two consumers with dental appliances and who experienced tack problems with conventional chewing gums, were recruited to judge the tackiness of the two products. Each consumer rated both products at the first bite and after two, five, ten, twelve and fifteen minutes of chewing, using the following scale:

| Description | Rating |
| --- | --- |
| Sticks severely | 4 |
| Sticks moderately | 3 |
| Sticks slightly | 2 |
| Does not stick at all | 1 |

After chewing, each consumer's dental appliance was examined by a dentist who rated the quantity of gum residue and the degree of stickiness on a similar four-point scale. The average results of the consumers' ratings, and the results of the dentist's ratings, are presented below.

| | Example 1 | Example 2 | % Confidence |
| --- | --- | --- | --- |
| Panelist' Tack Ratings | | | |
| First bite | 1.03 | 1.09 | N.S. |
| Two minutes | 1.28 | 1.09 | 97 |
| Five minutes | 1.38 | 1.13 | 91 |
| Ten minutes | 1.41 | 1.31 | N.S. |
| Twelve minutes | 1.47 | 1.25 | 91 |
| Fifteen minutes | 1.42 | 1.28 | N.S. |
| Dentists' Tack Ratings | | | |
| Quantity of residue | 1.22 | 1.00 | 89 |
| Degree of sticking | 1.44 | 1.38 | N.S. |

The "% Confidence" is the statistical certainty that the difference between two average ratings is not due to chance. For example, after two minutes, there was a 97% confidence that the gum of Example 2 was less tacky than the gum of Example 1. "N.S." stands for not significant, indicating that the % confidence was less than 85%.

Overall, considering the consistently better scores for the gum of Example 2 than for the gum of Example 1, we are highly confident that the gum of Example 2 is less tacky than the gum of Example 1.

While the embodiments of the invention disclosed herein are presently considered to be preferred, various modifications and improvements can be made without departing from the spirit and scope of the invention. The scope of the invention is indicated in the appended claims, and all changes that are within the meaning and range of equivalency of the claims are intended to be embraced therein.

We claim:

1. An abhesive, high flavor impact chewing gum, which is free of detackifier comprising:
    about 5 to about 95 weight percent of a non-tack chewing gum base;
    about 5 to about 95 weight percent of a water soluble bulk portion including one or more sweeteners; and
    a spray dried flavor ingredient present in an amount sufficient to impart an active flavor level of about 0.10 to about 1.50 weight percent of the chewing gum, and comprising a flavoring agent selected from the group consisting of spearmint, wintergreen, citrus oils, food acceptable aliphatic esters, and combinations thereof;
    wherein the non-tack chewing gum base comprises, based on the weight of the gum base:
    about 10 to about 55 weight percent polyvinyl acetate;
    about 15 to about 45 weight percent of an elastomer selected from the group consisting of polyisobutylene, butyl rubber, polyisoprene, isobutylene-isoprene copolymer, butadiene-styrene copolymer, and combinations thereof;
    about 5 to about 50 weight percent of a softener selected from the group consisting of hydrogenated vegetable oils, partially hydrogenated vegetable oils, animal fats, hydrogenated and partially hydrogenated animal fats, and combinations thereof; and
    about 5 to about 40 weight percent of a mineral adjuvant selected from the group consisting of calcium carbonate, talc, tricalcium phosphate, and combinations thereof.

2. The abhesive, high flavor impact chewing gum of claim 1, wherein the elastomer comprises a mixture of polyisobutylene and butyl rubber in a ratio of about three parts by weight polyisobutylene per two parts by weight butyl rubber.

3. The abhesive, high flavor impact chewing gum of claim 1, wherein the non-tack base further comprises one or more fatty acids present in an amount of up to about 20 percent by weight of the non-tack chewing gum base.

4. The abhesive, high flavor impact chewing gum of claim 1, wherein the non-tack base further comprises glycerides of fatty acids present in an amount of up to about 10 weight percent of the non-tack chewing gum base, and selected from the group consisting of monoglycerides, diglycerides, and combinations thereof.

5. The abhesive, high flavor impact chewing gum of claim 1, wherein the non-tack chewing gum base further comprises:
    about 2-10 weight percent of an emulsifier; and
    about 6-25 weight percent of a terpene resin.

6. The abhesive, high flavor impact chewing gum of claim 5, wherein the non-tack chewing gum base further comprises up to about 15 weight percent of a wax selected from the group consisting of natural waxes, petroleum waxes, paraffin waxes, microcrystalline waxes, and combinations thereof.

7. The abhesive, high flavor impact chewing gum of claim 5, wherein the emulsifier comprises glycerol monostearate.

8. The abhesive, high flavor impact chewing gum of claim 5, wherein the terpene is selected from the group consisting of alpha-terpene, beta-terpene, limonene, and combinations thereof.

9. The abhesive, high flavor impact chewing gum of claim 1, wherein the bulk portion comprises one or more sugar sweeteners selected from the group consisting of sucrose, dextrose, maltose, dextrin, dried invert sugar, fructose, levulose, galactose, corn syrup solids, and combinations thereof.

10. The abhesive, high flavor impact chewing gum of claim 1, wherein the bulk portion comprises one or more sugarless sweeteners selected from the group consisting of sorbitol, mannitol, xylitol, hydrogenated starch hydrolysates, maltitol, and combinations thereof.

11. The abhesive, high flavor impact chewing gum of claim 1, wherein the bulk portion comprises one or more high intensity sweeteners selected from the group consisting of sucralose, aspartame, salts of acesulfame, alitame, saccharin and its salts, cyclamic acid and its salts, glycyrrhizin, dihydrochalcones, thaumatin, monellin, and combinations thereof.

12. The abhesive, high flavor impact chewing gum of claim 1, wherein the bulk portion further comprises a softener selected from the group consisting of glycerin, lecithin, and combinations thereof.

13. The abhesive, high flavor impact chewing gum of claim 1, wherein the spray dried flavor ingredient is present in an amount sufficient to provide an active flavor level of about 0.30 to about 1.00 percent by weight of the chewing gum.

14. The abhesive, high flavor impact chewing gum of claim 1, wherein the spray dried flavor ingredient is present in an amount sufficient to provide an active flavor level of about 0.40 to about 0.80 percent by weight of the chewing gum.

15. The abhesive, high flavor impact chewing gum of claim 1, further comprising one or more liquid flavoring agents present in an amount of about 0.05 to about 1.5 weight percent of the chewing gum, in addition to the spray dried flavor ingredient.

16. An abhesive, spearmint flavored chewing gum which is free of detackifier comprising:
about 5 to about 95 weight percent of a non-tack chewing gum base;
about 5 to about 95 weight percent of a water soluble bulk portion including one or more sweeteners; and
a spray dried flavor ingredient comprising spearmint flavor present in an amount sufficient to impart an active flavor level of about 0.10 to about 1.50 weight percent of the chewing gum;
wherein the non-tack chewing gum base comprises, based on the weight of the gum base:
about 10 to about 55 weight percent polyvinyl acetate;
about 15 to about 45 weight percent of an elastomer selected from the group consisting of polyisobutylene, butyl rubber, polyisoprene, isobutylene-isoprene copolymer, butadiene-styrene copolymer, and combinations thereof;
about 5 to about 50 weight percent of a softener selected from the group consisting of hydrogenated vegetable oils, partially hydrogenated vegetable oils, animal fats, hydrogenated and partially hydrogenated animal fats, and combinations thereof; and
about 5 to about 40 weight percent of a mineral adjuvant selected from the group consisting of calcium carbonate, talc, tricalcium phosphate, and combinations thereof.

17. An abhesive, wintergreen flavored chewing gum which is free of detackifier comprising:
about 5 to about 95 weight percent of a non-tack chewing gum base;
about 5 to about 95 weight percent of a water soluble bulk portion including one or more sweeteners; and
a spray dried flavor ingredient present comprising wintergreen flavor present in an amount sufficient to impart an active flavor level of about 0.10 to about 1.50 weight percent of the chewing gum;
wherein the non-tack chewing gum base comprises, based on the weight of the gum base:
about 10 to about 55 weight percent polyvinyl acetate;
about 15 to about 45 weight percent of an elastomer selected from the group consisting of polyisobutylene, butyl rubber, polyisoprene, isobutylene-isoprene copolymer, butadiene-styrene copolymer, and combinations thereof;
about 5 to about 50 weight percent of a softener selected from the group consisting of hydrogenated vegetable oils, partially hydrogenated vegetable oils, animal fats, hydrogenated and partially hydrogenated animal fats, and combinations thereof; and
about 5 to about 40 weight percent of a mineral adjuvant selected from the group consisting of calcium carbonate, talc, tricalcium phosphate, and combinations thereof.

18. An abhesive, fruit flavored chewing gum which is free of detackifier, comprising:
about 5 to about 95 weight percent of a non-tack chewing gum base;
about 5 to about 95 weight percent of a water soluble bulk portion including one or more sweeteners; and
a spray dried flavor ingredient comprising one or more fruit flavors present in an amount sufficient to impart an active flavor level of about 0.10 to about 1.50 weight percent of the chewing gum;
wherein the non-tack chewing gum base comprises, based on the weight of the gum base:
about 10 to about 55 weight percent polyvinyl acetate;
about 15 to about 45 weight percent of an elastomer selected from the group consisting of polyisobutylene, butyl rubber, polyisoprene, isobutylene-isoprene copolymer, butadiene-styrene copolymer, and combinations thereof;
about 5 to about 50 weight percent of a softener selected from the group consisting of hydrogenated vegetable oils, partially hydrogenated vegetable oils, animal fats, hydrogenated and partially hydrogenated animal fats, and combinations thereof; and
about 5 to about 40 weight percent of a mineral adjuvant selected from the group consisting of calcium carbonate, talc, tricalcium phosphate, and combinations thereof.

19. The abhesive, fruit flavored chewing gum of claim 18, wherein the spray dried flavor ingredient comprises a citrus oil selected from the group consisting of lemon oil, orange oil, tangerine oil, lime oil, grapefruit oil, and combinations thereof.

20. The abhesive, fruit flavored chewing gum of claim 18, wherein the spray dried flavor ingredient comprises an acetate selected from the group consisting of amyl acetate, isoamyl acetate, isobutyl acetate, ethyl acetate, ethyl butyrate, ethyl propionate, and combinations thereof.

21. A method for preparing an abhesive, high flavor impact chewing gum which is free of detackifier, comprising the steps of:

spray drying a flavor ingredient comprising a flavoring agent selected from the group consisting of spearmint, wintergreen, citrus oils, esters, and combinations thereof;

preparing a non-tack chewing gum base;

providing one or more sweeteners; and thoroughly mixing the spray dried flavor ingredient, the non-tack chewing gum base and the one or more sweeteners together to form an abhesive chewing gum mass comprising about 5 to about 95 weight percent of the non-tack chewing gum base, about 5 to about 95 weight percent of the one or more sweeteners, and a sufficient amount of the spray dried flavor ingredient to impart an active flavor level of about 0.10 to about 1.50 weight percent of the chewing gum;

wherein the non-tack chewing gum base comprises, based on the weight of the gum base:

about 10 to about 55 weight percent polyvinyl acetate;

about 15 to about 45 weight percent of an elastomer selected from the group consisting of polyisobutylene, butyl rubber, polyisoprene, isobutylene-isoprene copolymer, butadiene-styrene copolymer, and combinations thereof;

about 5 to about 50 weight percent or a softener selected from the group consisting of hydrogenated vegetable oils, partially hydrogenated vegetable oils, animal fats, hydrogenated and partially hydrogenated animal fats, and combinations thereof; and about 5 to about 40 weight percent of a mineral adjuvant selected from the group consisting of calcium carbonate, talc, tricalcium phosphate, and combinations thereof.

22. The method of claim 21 wherein the sweetener is selected from the group consisting of sugar sweeteners, sugarless sweeteners, high intensity sweeteners, and combinations thereof.

23. The method of claim 21 wherein the flavoring agent comprises spearmint flavor.

24. The method of claim 21 wherein the flavoring agent comprises wintergreen flavor.

25. The method of claim 21 wherein the flavoring agent comprises one or more citrus oils.

26. The method of claim 21 wherein the flavoring agent comprises one or more food acceptable aliphatic esters.

27. The method of claim 21 further comprising the steps of providing a second flavoring agent in an amount of about 0.05 to about 1.5 weight percent of the chewing gum, and thoroughly mixing the second flavoring agent with the spray dried flavor ingredient, the non-tack chewing gum base and the one or more sweeteners.

* * * * *

UNITED STATES PATENT AND TRADEMARK OFFICE
CERTIFICATE OF CORRECTION

PATENT NO. : 5,266,336
DATED : November 30, 1993
INVENTOR(S) : Gordon N. McGrew, et al.

It is certified that error appears in the above-indentified patent and that said Letters Patent is hereby corrected as shown below:

On title page, item [56]
IN THE REFERENCES CITED under U.S. PATENT DOCUMENTS", on the line following the 4,352,822 (Cherukuri et al.) reference insert:

--4,352,822    9/1985    Cherukuri et al.--

In column 1, line 7, delete "BACKGROUND" and substitute therefor --FIELD--.

In column 1, line 42, before "the" delete "to".

In column 9, line 50, delete "Panelist'" and substitute therefor --Panelists'--.

Signed and Sealed this

Eighteenth Day of October, 1994

Attest:

BRUCE LEHMAN

*Attesting Officer*          *Commissioner of Patents and Trademarks*